United States Patent [19]

Oh

[11] Patent Number: 5,388,216
[45] Date of Patent: Feb. 7, 1995

[54] CIRCUIT FOR CONTROLLING GENERATION OF AN ACKNOWLEDGE SIGNAL AND A BUSY SIGNAL IN A CENTRONICS COMPATIBLE PARALLEL INTERFACE

[75] Inventor: Su-Whan Oh, Suwon, Rep. of Korea

[73] Assignee: SamSung Electronics Co., Ltd., Suwon, Rep. of Korea

[21] Appl. No.: 565,477

[22] Filed: Aug. 10, 1990

[30] Foreign Application Priority Data

Aug. 17, 1989 [KR] Rep. of Korea ............... 11724/1989

[51] Int. Cl.$^6$ .............................................. G06F 3/12
[52] U.S. Cl. ................................... 395/275; 395/550; 364/DIG. 2; 364/927.92; 364/930
[58] Field of Search ............... 395/550, 275, 112, 114, 395/725, 325; 307/415, 265, 268, 269; 400/61, 62

[56] References Cited

U.S. PATENT DOCUMENTS

| | | | |
|---|---|---|---|
| 4,426,166 | 2/1984 | Bowling | 395/114 |
| 4,954,983 | 9/1990 | Klingman | 395/275 |
| 4,991,121 | 2/1991 | Minoura et al. | 395/154 |
| 5,012,435 | 4/1991 | Bailey et al. | 395/550 |
| 5,019,966 | 5/1991 | Saito et al. | 395/550 |
| 5,040,109 | 8/1991 | Bowhill et al. | 395/550 |

OTHER PUBLICATIONS

Comer, D. T., "Digital Logic & State Machine Design", New York, 1982, pp. 202–206.

"Alps P2000G/P2100G Printer User's Manual", Alps America 1986 pp. 4-2, 4-3, 4-4.

Wendell Watson, "The Printer Interface", *DG Review*, Apr. 1988 Abstract & 4 pages of full test printout.

R. L. L. Hu, "Parallel to Serial Interface–Interfacing a Centronics Output to an RS323 Serial Printer", *Radio-Electronics*, May 1985 Computer Digest pp. 8–9.

*Primary Examiner*—Robert L. Richardson
*Assistant Examiner*—D. Dinh
*Attorney, Agent, or Firm*—Robert E. Bushnell

[57] ABSTRACT

There is disclosed a circuit for controlling the generation of a busy signal and an acknowledge signal properly to allow fast, accurate data communication between communication systems. The circuit includes: a Centronics interface cable for generating a strobe signal upon receiving data from a data communication device; a busy signal generator coupled to the Centronics interface cable, for generating a busy signal in response to the strobe signal and a busy signal generation control signal; a CPU coupled so as to control the entire system, for generating a received data processing completion signal in response to the busy signal; an acknowledge signal generator coupled to the Centronics interface cable, for generating an acknowledge signal in response to the state of the received data processing completion signal; and a counter for counting a predetermined clock responsive to the state of the received data processing completion signal to provide the acknowledge signal generator with an acknowledge signal generation control signal and to provide the busy signal generator with the busy signal.

24 Claims, 4 Drawing Sheets

CIRCUIT FOR CONTROLLING GENERATION OF AN ACKNOWLEDGE SIGNAL AND A BUSY SIGNAL IN A CENTRONICS COMPATIBLE PARALLEL INTERFACE

BACKGROUND OF THE INVENTION

This invention relates generally to a communication control circuit in a system using a Centronics compatible parallel interface. In particular, this invention relates to a circuit for generating an acknowledge signal and a busy signal, wherein the above two signals control sending and receiving of the communication data between at least two communication stations.

Generally, a laser printer, for example, using a Centronics compatible parallel interface has a specific data communication method of communicating data between communication systems, which follows basically the regulation of the Centronics. For instance, in a conventional method, when data is transmitted from another data communication device, strobe signal $S_1$ output from a Centronics interface cable 30 will be transmitted together with the data communication signal, as illustrated in FIG. 1. If the strobe signal $S_1$ is generated, a busy signal $S_2$ of the logic high state will be generated to prevent transmission of different data until the data processing of the data transmitted currently is completely executed by a CPU 10. In this case, the busy signal $S_2$ is applied to an interrupt terminal of the CPU 10 so as to inform the CPU 10 of incoming data. Then, the CPU 10 starts to read in the data received from the other data communication device and generates an acknowledge signal $S_3$ from an output port $Y_1$ thereof to an acknowledge terminal $\overline{ACK}$ of the Centronics interface cable 30 in order to send it to the other data communication device so that the completion of the data receiving may be indicated to the other data communication device.

At about the same moment, the busy signal $S_2$ of the logic high, generated by the busy signal generator 20, will make a transition from the logic high to low in order to prepare for other data receiving. On the other hand, if the CPU 10 is unable to receive the data, the busy signal $S_2$ must be switched to the logic high again.

For instance, if the busy signal generator 20 produces the busy signal $S_2$ under the control of a first control signal $S_5$ which controls the generation and release of the busy condition according to the CPU 10, then the busy signal $S_2$ and a second control signal $S_6$ generated from the CPU 10 are provided to an OR gate $G_1$ which applies the logical result thereof to a busy terminal BUSY of the Centronics interface cable 30. In the meantime, the second control signal $S_6$ is used for generating or releasing the busy condition according to the CPU 10.

With respect to the timing relation of the acknowledge signal $S_3$ and busy signal $S_2$ data receiving, when considered in the place of the other data communication device (a transmitter), the busy signal $S_2$ of the receiver (in this case, the system of FIG. 1) becomes the logic low state after the transmitter sends out one frame of data. If the transmitter receives the acknowledge signal $S_3$ generated from the receiver, the transmitter will be ready to send another frame of data. It should be noted that these operations are controlled by the CPU 10 by means of software.

As illustrated in FIG. 3, the system shown in FIG. 1 receives data at time point $t_1$, reads in the data with the CPU 10 at time point $t_2$ and releases the busy signal $S_2$ and generates the acknowledge signal $S_3$ in sequence at time point $t_3$ through the output port, so that the system informs the receiver that the system is ready to receive more data.

If the transmitter transmits the next data at the instance of time point $t_3$, then again the CPU 10 of the receiver is provided with the busy signal $S_2$ generated by the busy signal generator 20. According to the conventional method as shown in FIG. 3, however, if the next data is transmitted from the transmitter at the time point $t_3$ at which the busy signal $S_2$ and the acknowledge signal $S_3$ change to logic low, a predetermined time is required for the acknowledge signal $S_3$ to change to logic high, which may cause mis-operation of the CPU 10 because the data processing should not be made while the acknowledge signal $S_3$ is still at the logic low state.

To alleviate this problem, there is proposed a method of delaying the busy signal $S_2$ until the acknowledge signal $S_3$ changes to the logic high at time point $t_4$. In this case, however, there arises another problem that, in some cases, the so-called hand-shaking is executed by only the strobe signal $S_1$ and acknowledge signal $S_3$. Furthermore, when the acknowledge signal $S_3$ is processed in the CPU 10 by the software, the acknowledge signal $S_3$ stays at the logic low state for about 10 $\mu$sec during which the CPU 10 generates only the acknowledge signal $S_3$ without processing other data. Therefore, the system performance is deteriorated overall.

Moreover, in the event that the busy signal $S_2$ and acknowledge signal $S_3$ are all dealt with by the software processing as illustrated in FIGS. 3 and 4, the output will be produced from output port $Y_0$ and output port $Y_1$ of the CPU 10, that may cause a relatively long execution time. Such a delay may be considered a negligible amount in some cases, however when it comes to a situation which should handle a great deal of data to be transmitted therethrough, the system performance will be influenced significantly.

SUMMARY OF THE INVENTION

It is accordingly an object of the present invention to provide a circuit for controlling generation of a busy signal and acknowledge signal properly to allow fast, accurate data communication between the communication systems.

To achieve the above object and other features of the present invention, an inventive circuit includes: a Centronics interface cable coupled for generating a strobe signal upon receiving data from a data communication device; a busy signal generator coupled electrically to the Centronics interface cable, for generating a busy signal in response to the strobe signal and a busy signal generation control signal; a central processing unit coupled so as to control the entire system, for generating a received data processing completion signal in response to the busy signal; an acknowledge signal generator coupled to the Centronics interface cable, for generating an acknowledge signal in response to the state of the received data processing completion signal; and a counter for counting a predetermined clock responsive to the state of the received data processing completion signal to provide the acknowledge signal generator with an acknowledge signal generation control signal and provide the busy signal generator with the busy signal.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 1:
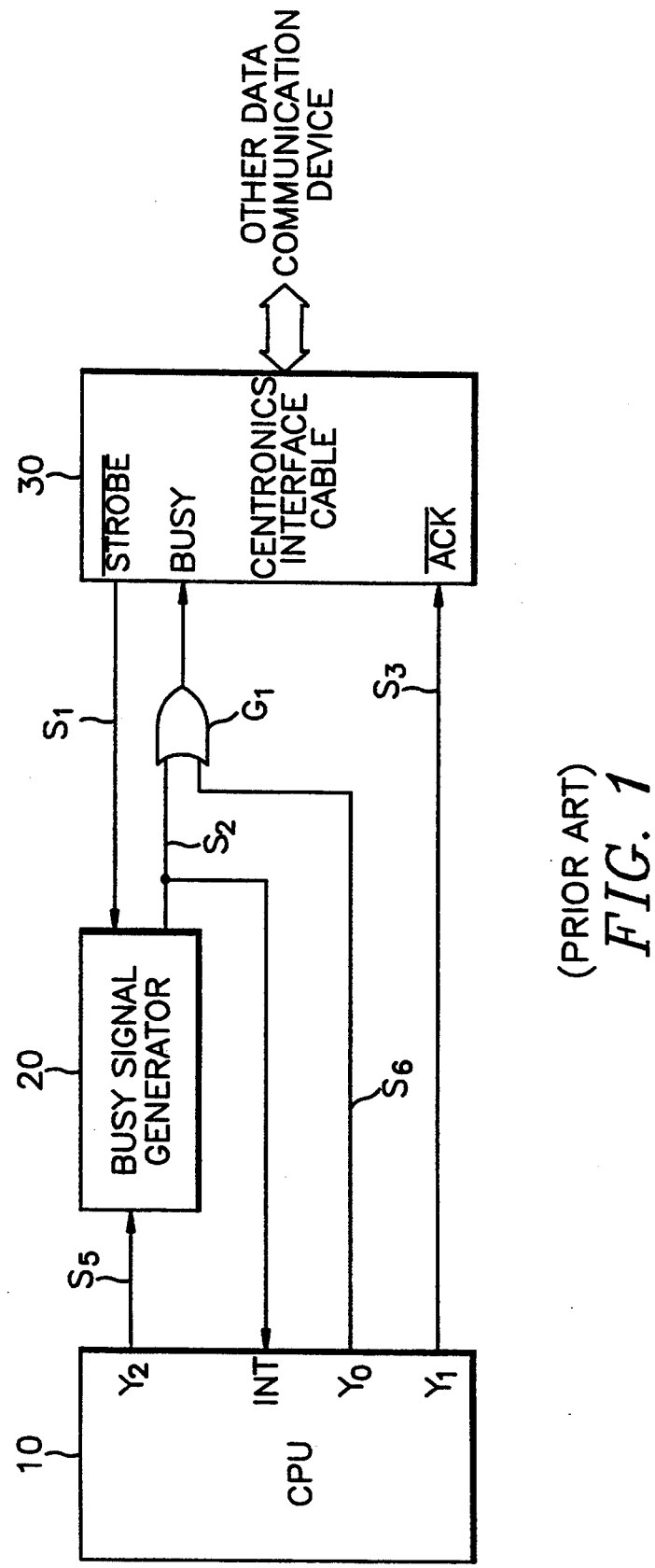
FIG. 1 shows a conventional Centronics compatible interface circuit.
Figure 2:
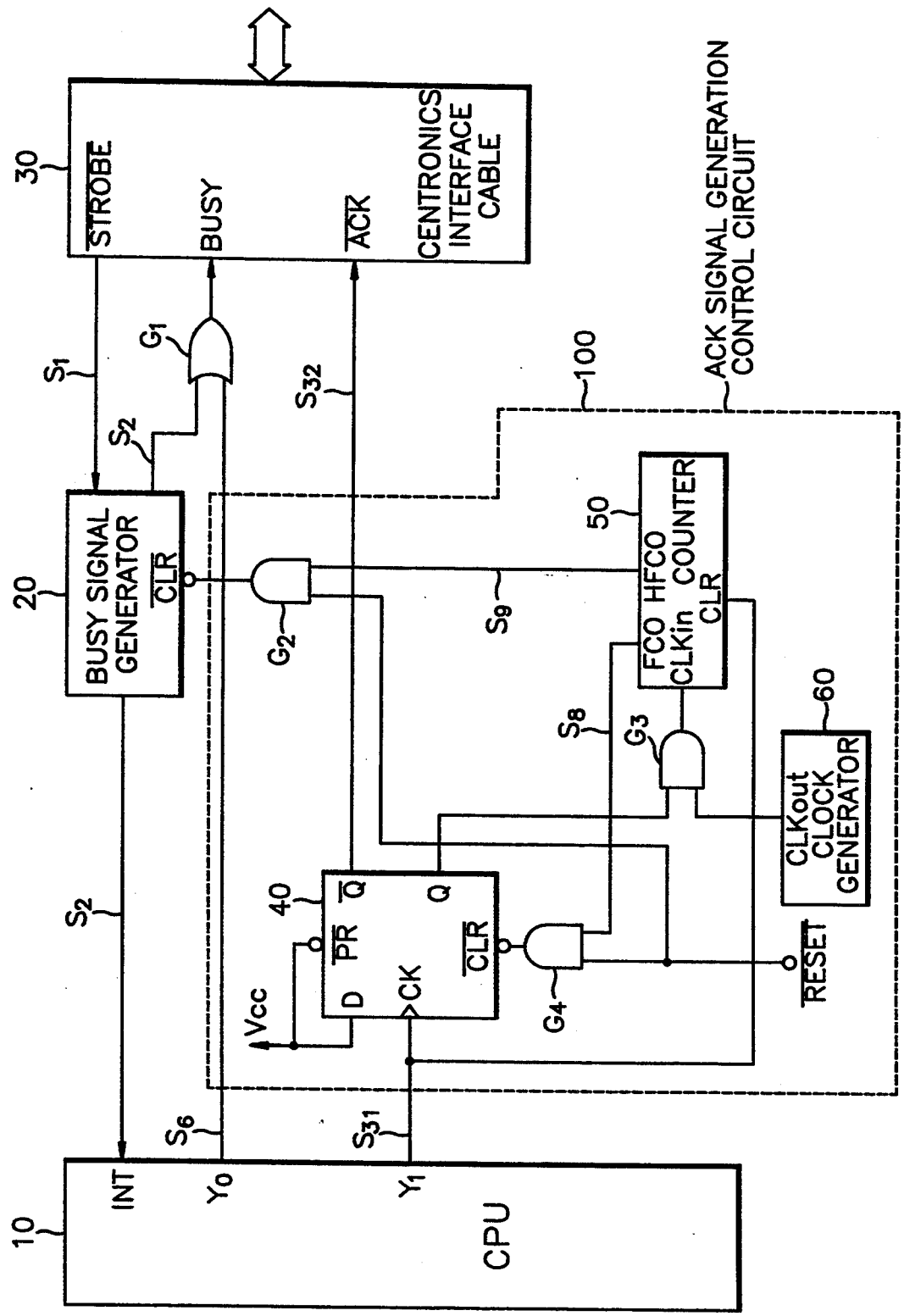
FIG. 2 shows an inventive Centronics compatible interface circuit.
Figure 3:
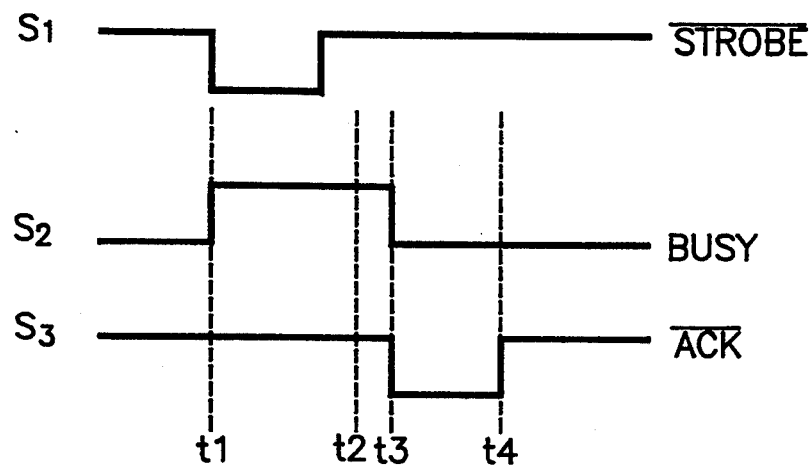
FIGS. 3 and 4 show waveforms of the control signals according to the conventional Centronics compatible interface circuit.
Figure 4:
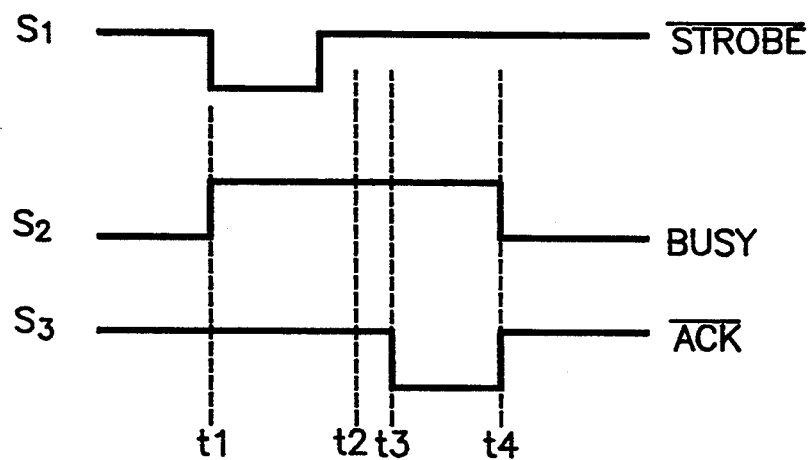

Referring primarily to FIG. 2, an inventive circuit, only as a preferred embodiment, includes a CPU (Central Processing Unit) 10 for controlling the overall system, to which a busy signal generator 20 is coupled to provide an interrupt terminal INT of the CPU 10 with a busy signal $S_2$ generated therefrom. The busy signal generator 20 generates the busy signal $S_2$ to provide both the interrupt terminal INT of the CPU 10 and a busy terminal BUSY of a Centronics interface cable 30 through a logic gate $G_1$, under the control of a strobe signal $S_1$ produced from the Centronics interface cable and other predetermined control signal. The Centronics interface cable 30 is designed to generate the strobe signal $S_1$ when data is received from the other data communication device. In addition, an acknowledge signal generation control circuit 100 is coupled to the Centronics interface cable 30 to control the generation of the acknowledge signal $S_{32}$ provided to the Centronics interface cable 30, under the control of the CPU 10. A control signal from the acknowledge signal generation control circuit 100 is coupled to a clear terminal of the busy signal generator 20 to control the generation of the busy signal $S_2$.

With respect to the construction of the acknowledge signal generation control circuit 100, a clock generator 60 generates a clock signal of a predetermined frequency which is coupled to an input terminal of a logic AND gate $G_3$ which produces a logic combination with a specific control signal from a bistable multivibrator D flip-flop 40 in response to the data processing completion signal $S_{31}$ from the CPU 10. The output of the logic AND gate $G_3$ is applied to a counter 50 which counts the output of the gate $G_3$ to generate an acknowledge signal generation control signal $S_8$ and the busy release signal $S_9$. Then, output of an AND gate $G_4$ which logically combines the acknowledge signal generation control signal $S_8$ and a reset control signal $\overline{RESET}$, is coupled to a clear terminal $\overline{CLR}$ of the D flip-flop 40 which generates the acknowledge signal $S_{32}$ synchronized with the data processing completion signal $S_{31}$. In addition, the clear terminal $\overline{CLR}$ of the busy signal generator 20 is coupled to the output of the AND gate $G_2$ which logically combines the reset control signal $\overline{RESET}$ with the busy release signal $S_9$.

Figure 5:
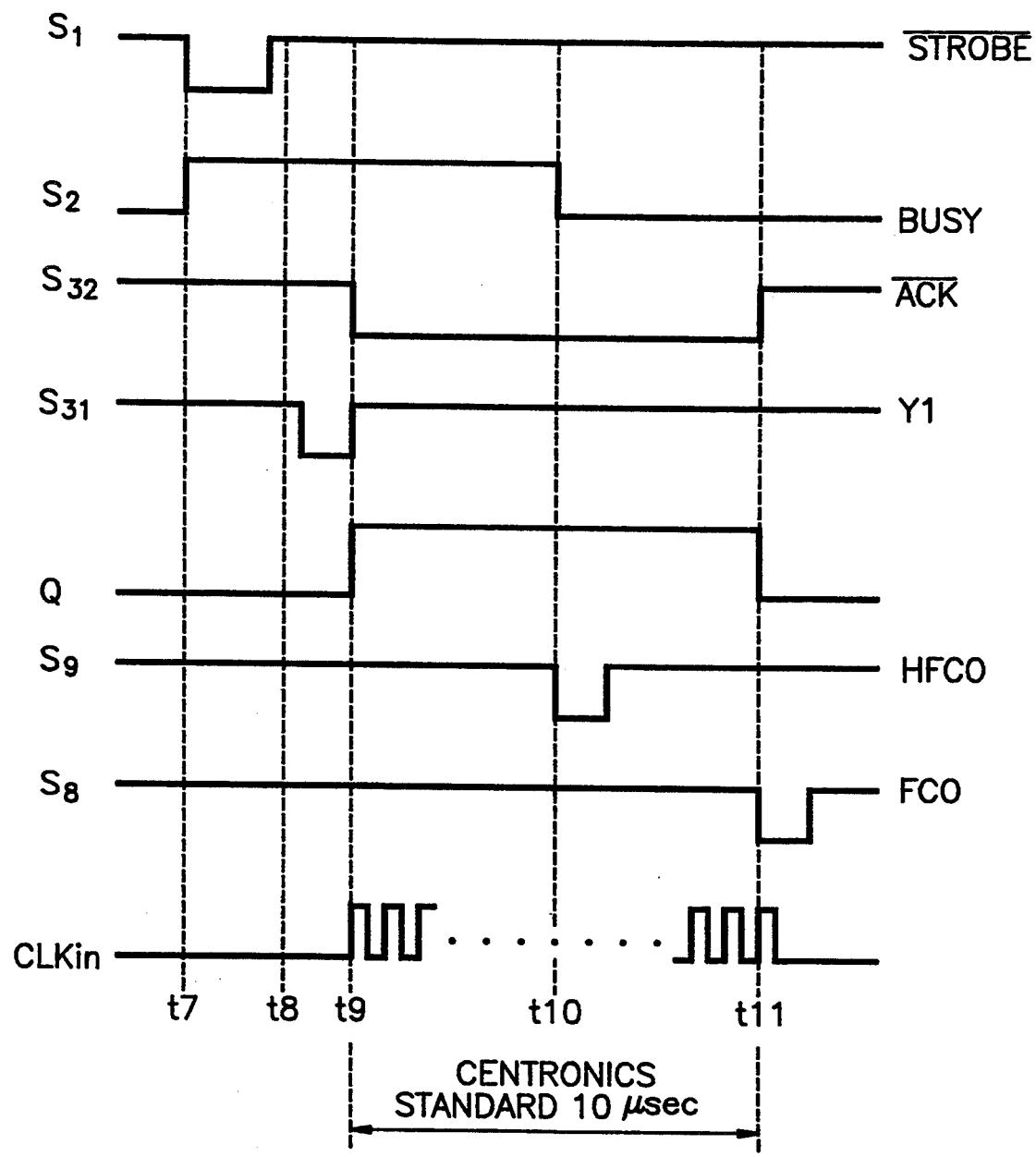
FIG. 5 shows waveforms of the control signals according to the present invention.

In operation, if data is received from the other data communication device, the strobe signal $S_1$ is generated to the busy signal generator 20 from the Centronics interface cable 30 at time point $t_7$ of FIG. 5. At this moment, the busy signal $S_2$ of logic high is generated from the busy signal generator 20 and applied to an input terminal of the OR gate $G_1$ and at the same time to the interrupt terminal INT of the CPU 10, thereby informing the other data communication device that the system is in the data receiving state.

When the CPU 10 completes the data processing by the interrupt signal (hereinafter, for convenience, refers to the busy signal $S_2$ applied to the interrupt terminal INT of the CPU 10), then the data processing completion signal $S_{31}$ is generated through the output port $Y_1$ which activates the acknowledge signal generation control circuit 100. The data processing completion signal $S_{81}$ sets the initial value of the counter 50 to zero. On the other hand, the D flip-flop 40 is clocked at the rising edge of the data processing to produce the logic high state through an inverting terminal $\overline{Q}$ thereof to the acknowledge signal input terminal $\overline{ACK}$ of the Centronics interface cable 30. The acknowledge signal of the logic high which is the output of the inverting terminal $\overline{Q}$ of the D flip-flop 40, is changed to the logic low state at time point $t_9$ of FIG. 5.

At this moment, the CPU 10 completes the Centronics handshaking operation and gets ready for receiving the next data. After the time point $t_9$, since the non-inverting output Q of the D flip-flop 40 which is applied to an input terminal of the AND gate $G_3$ is at the logic high state as shown in FIG. 5, the clock output CLKout of the clock generator 60 will be delivered to the clock input terminal CKin of the counter 50, at which the clock is counted, through the AND gate $G_3$.

In this embodiment, the maximum counting value of the counter 50 is established to count up to 10 $\mu$sec by adjusting the clock generator 60. Therefore, if the counter reaches the maximum value, the acknowledge signal $S_{32}$ is changed to the logic high state at the time point $t_{11}$. In this case, the busy signal $S_2$ is changed to the logic low at the time point $t_{10}$ at which the counter value is the half, i.e. 5 $\mu$sec, of the maximum counting value (10 $\mu$sec). At this moment, the busy release signal $S_9$ from the counter 50 is provided to the busy signal generator 20 through the AND gate $G_2$, releasing the busy state. Therefore, at the time point $t_{10}$, it is possible to receive the next data.

As stated heretofore, according to the present invention, since the CPU 10 controls the generation of the busy signal and acknowledge signal only by the acknowledge generation control signal, the system performance can be improved. Furthermore, unlike the conventional method, it is not required for the inventive system to waste about 10 $\mu$sec because the CPU 10 completes the generation of the acknowledge signal by one-time port accessing. It is another advantage of the present invention that even in the event that the communication system using a relatively low-speed CPU is used, stable and accurate data communication is secured, because the busy signal and acknowledge signal are generated on a hardware-basis, allocating enough time interval.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A circuit for controlling generation of an acknowledge signal and a busy signal in a Centronics compatible parallel interface after transmission of a block of data, said circuit comprising:

a Centronics interface port coupled for receiving a strobe signal from a Centronics interface;

busy signal generating means coupled electrically to the Centronics interface port, for generating a busy signal in response to said strobe signal and disabling the generation of said busy signal in response to a busy signal generation control signal;

acknowledge signal generating means coupled to said Centronics interface port, for generating an acknowledge signal in response to a state of a received data processing completion signal to be generated by a central processing unit, and for disabling the generation of said acknowledge signal in response to an acknowledge signal generation control signal, said acknowledge signal generating means comprising:

means for generating clock pulses;

completion signal receiving means for initiating generation of said acknowledge signal in response to said received data processing completion signal, and for terminating the generation of said acknowledge signal in response to said acknowledge signal generation control signal; and gating means responsive to said completion signal receiving means, for gating said clock pulses; and counting means for counting said clock pulses gated by said gating means in response to the state of said received data processing completion signal to provide said acknowledge signal generating means with said acknowledge signal generation control signal after providing said busy signal generating means with said busy signal generation control signal.

2. A circuit for controlling generation of an acknowledge signal and a busy signal in a parallel interface, said circuit comprising:

busy signal generating means for generating said busy signal in response to reception of a strobe signal and disabling generation of said busy signal in response to a busy release signal;

central processing means for receiving data upon reception of said busy signal, and for generating a completion signal upon completion of reception said data;

means for generating clock signals;

completion signal receiving means for generating a control signal and said acknowledge signal in response to reception of said completion signal, and for terminating generation of said acknowledge signal upon reception of an acknowledge signal generation signal;

logic means for producing an AND logic combination of said control signal and said clock signals; and means for generating said busy release signal in response to said AND logic combination subsequent to a first predetermined time period after the generation of said completion signal, and for then generating said acknowledge signal generation signal in response to said AND logic combination after a second and subsequent, predetermined time period has elapsed.

3. A circuit as set forth in claim 2, further comprising:
means for sending said acknowledge signal generation signal as a clear signal to a clear terminal of a flip-flop, said completion signal receiving means comprising said flip-flop.

4. A circuit as set forth in claim 2, further comprising:
means for sending said busy release signal as a clear signal to a clear terminal of said busy signal generating means in response to a reset signal.

5. A circuit for generating an acknowledge signal and terminating generation of a busy signal in response to reception of a completion signal generated by a central processing unit to indicate data processing completion, said circuit comprising:

means for generating clock signals;

completion signal receiving means for generating a control signal and said acknowledge signal in response to reception of said completion signal, and for disabling generation of said acknowledge signal upon reception of an acknowledge signal generation control signal;

means for gating said clock signals with said control signal; and generation control means for disabling generation of said busy signal in response to counts of said clock signals gated by said gating means, and for then generating said acknowledge signal generation control signal in response to succeeding counts of said clock signals gated by said gating means.

6. A circuit as claimed in claim 5, further comprising:
means for sending said acknowledge signal generation control signal as a clear signal to a clear terminal of said completion signal receiving means to disable generation of said acknowledge signal, said completion signal means comprising a D-type flip-flop.

7. A circuit as claimed in claim 5, wherein said generation control means provides said acknowledge signal generation control signal to said completion signal receiving means when a counts of said counts of said clock signals initiated by reception of said completion signal reaches a predetermined value, and disables generation of said busy signal when the count value of said clock of said clock signals reaches one-half of said predetermined value.

8. A circuit as claimed in claim 6, further comprising:
busy signal generator means for generating said busy signal to said central processing unit; and
means for sending a busy release signal generated by said generation control means as a clear signal to a clear terminal of said busy signal generator means for terminating generation of said busy signal.

9. A process for controlling states of an acknowledge signal and a busy signal in a parallel interface circuit between a sending device and a receiving device, said parallel interface circuit comprising a clock generating clock pules; a completion signal receiving device for generating a control signal and said acknowledge signal in response to reception of a completion signal and for disabling generation of said acknowledge signal upon reception of an acknowledge signal generation control signal; a gating device for gating the clock pulses with the control signal; and a counter for counting the clock pulses gated by the gating device for disabling generation of said busy signal subsequently generating said acknowledge signal generation control signal, said process comprising the steps of:

changing a logic state of said busy signal from a first state to a second state in response to reception of a strobe signal generated by said sending device for indicating transmission of data;

enabling said sending device to generate said completion signal upon completion of reception and processing of data by said receiving device;

resetting said counter for making count of said clock pulses in response to said completion signal;

changing a logic state of said acknowledge signal generated from said completion signal receiving device from a first state to a second state upon reception of said completion signal;

changing the logic state of said busy signal from the second state to the first state when a counter value of said counter reaches one-half of a predetermined counting value; and changing the logic state of said acknowledge signal from the second state to the first state when the counter value of said counter reaches said predetermined counting value.

10. A process as set forth in claim 9, wherein said maximum counting value is a set value.

11. A process as set forth in claim 10, wherein said maximum counting value is 10 $\mu$sec.

12. A circuit as claimed in claim 1, wherein said completion signal receiving means comprises a D-type flip-flop.

13. A circuit for controlling generation of an acknowledge signal and a busy signal in a parallel interface after transmission of blocks of data, said circuit comprising:

busy signal generating means for generating a busy signal to be received by a data sending device in response to a strobe signal generated by said sending device for indicating data transmission to a data receiving device, and for disabling the generation of said busy signal in response to a busy signal generation control signal;

acknowledge signal generating means for generating an acknowledge signal to be received by said data sending device in response to a received data processing completion signal generated by said data receiving device to indicate reception of ones of said blocks of data, and for disabling the generation of said acknowledge signal in response to an acknowledge signal generation control signal generated a second predetermined time period after said received data processing completion signal, said acknowledge signal generating means comprising a bistable multivibrator configured to generate said acknowledge ,signal received by said data sending device at a non-inverted output and coupled to receive said data processing completion signal at a clock terminal, for generating said acknowledge signal for gating clock pluses at an inverted output; and timing means for generating said busy signal generation control signal a first predetermined time period after reception of said data processing completion signal and prior to generating said acknowledge signal generation control signal, said timing means comprising a counter configured to be reset in response to said data processing completion signal, for counting said clock pulses gated by said acknowledge signal.

14. A circuit as claim in claim 13, wherein said parallel interface comprises a Centronics compatible type interface.

15. A circuit as claim in claim 13, wherein said second predetermined time period is approximately twice as long as said first predetermined time period.

16. A circuit as claim in claim 15, wherein said second predetermined time period is approximately ten microseconds.

17. A circuit as claim in claim 5, wherein said completion signal receiving means comprises a D-type flip-flop.

18. A circuit for controlling generation of an acknowledge signal and a busy signal in a parallel interface after transmission of blocks of data, said circuit comprising:

busy signal generating means for generating a busy signal to be received by a data sending device in response to a strobe signal generated by said sending device for indicating data transmission to a data receiving device, and for disabling the generation of said busy signal a first predetermined time period after receipt of a received data processing completion signal generated by a data receiving device to indicate completion of processing of a most recently received one of said blocks of data; and acknowledge signal generating means for generating an acknowledge signal to be received by said data sending device indicating receipt of data by said data receiving device, and for disabling the generation of said acknowledge signal a second predetermined time period after the generation of said busy signal is disabled, said acknowledge signal generating means comprising:

means for generating a clock signal;

flip-flop means for generating a control signal and said acknowledge signal in response to reception of said received data processing completion signal generated by said data receiving device and for disabling generation of said acknowledge signal upon reception of an acknowledge signal generation control signal;

gating means for gating the clock signal with the control signal; and counter means for enabling said busy signal generating means to disable generation of said busy signal in response to counts of the clock signal gated by said gating means and generating said acknowledge signal generation control signal in response to succeeding counts of the clock signal gated by said gating means.

19. A circuit as claim in claim 18, wherein said second predetermined time period is approximately equal to said first predetermined time period.

20. A circuit as claim in claim 18, wherein said first predetermined time period is approximately five microseconds.

21. A circuit as claim in claim 20, wherein said first predetermined time period is approximately five microseconds.

22. A circuit for controlling generation of an acknowledge signal and a busy signal in a parallel interface after transmission of blocks of data from a sending device to a central processing unit, said circuit comprising:

busy signal generating means for generating a busy signal to be received by said data sending device in response to a strobe signal generated by said sending device for indicating data transmission to said central processing unit, and for disabling the generation of said busy signal in response to a busy release signal;

acknowledge signal generating means for generating an acknowledge signal to be received by said data sending device in response to a received data processing completion signal generated by said central processing unit to indicate reception and completion of processing of a most recently received one of said blocks of data, and for disabling the generation of said acknowledge signal in response to an acknowledge signal generation control signal;

a clock generator for generating clock pulses; and a counter for initiating a count of said clock pulses to determine a first predetermined time period and a second predetermined time period, longer than said first predetermined time period, from said received data processing completion signal, for generating said busy release signal at said first predetermined time period, and for generating said acknowledge signal generation control signal at said second predetermined time period.

23. A circuit for controlling generation of an acknowledge signal and a busy signal in a parallel interface after transmission of data from a data sending device to a processing device, said circuit comprising:

busy signal generating means for generating a busy signal to be received by said data sending device in response to a strobe signal generated by said data sending device for indicating data transmission to said processing device, and for disabling generation of said busy signal in response to a release signal;

means for generating clock pulses;

flip-flop means for generating said acknowledge signal to be received by said data sending device in response to reception of a data processing completion signal generated by said processing device indicative of reception and processing completion of received data from said data sending device, and for disabling the generation of said acknowledge signal in response to reception of an acknowledge control signal; and counter means for making a count of said clock pulses in response to reception of said data processing completion signal, for generating said release signal when a counted value of said count of said clock pulses reaches a first predetermined value and for generating said acknowledge control signal when the counted value of said count of said clock pulses reaches a second predetermined value subsequent to said first predetermined value.

24. A circuit as set forth in claim 3, further comprising:

means for sending said busy release signal as a clear signal to a clear terminal of said busy signal generating means in response to a reset signal.

* * * * *

UNITED STATES PATENT AND TRADEMARK OFFICE
CERTIFICATE OF CORRECTION

PATENT NO.  : 5,388,216
DATED       : Feb. 7, 1995
INVENTOR(S) : Su-Whan Oh

It is certified that error appears in the above-indentified patent and that said Letters Patent is hereby corrected as shown below:

| | | |
|---|---|---|
| Column 1, | line 31, | after "read", delete "in"; |
| | line 42, | after "data", delete "receiving"; |
| | line 57, | after "$S_2$", insert --after--; |
| | line 63, | after "$S_2$", insert a space; |
| Column 2, | line 1, | after "$t_2$", insert a comma: |
| | line 2, | after "$S_2$", insert a space; |
| Column 3, | line 47, | after "multivibrator", delete "D flip-flop"; |
| Column 4, | line 12, | after "signal", change "$S_{81}$" to --$S_{31}$--; |

UNITED STATES PATENT AND TRADEMARK OFFICE
CERTIFICATE OF CORRECTION

PATENT NO. : 5,388,216
DATED : Feb. 7, 1995
INVENTOR(S) : Su-Whan Oh

It is certified that error appears in the above-indentified patent and that said Letters Patent is hereby corrected as shown below:

IN THE CLAIMS

| | | |
|---|---|---|
| Column 5, | line 46, | after "reception", insert --of--; |
| Column 6, | line 32, | after "signal", insert --receiving--; |
| | line 37, | after " a ", change "counts" to --count value--; |
| | line 41, | in the beginning, change "clock" to --counts--; |
| | line 53, | after "clock", insert --generator for--; |
| | line 54, | after "clock", change "pules" to --pulses--; |
| Column 7, | line 4, | after "making", insert -- a --; |
| | line 48, | after "acknowledge", delete a comma: |

Signed and Sealed this

Thirteenth Day of August, 1996

Attest:

BRUCE LEHMAN

*Attesting Officer*     *Commissioner of Patents and Trademarks*